Patented July 14, 1942

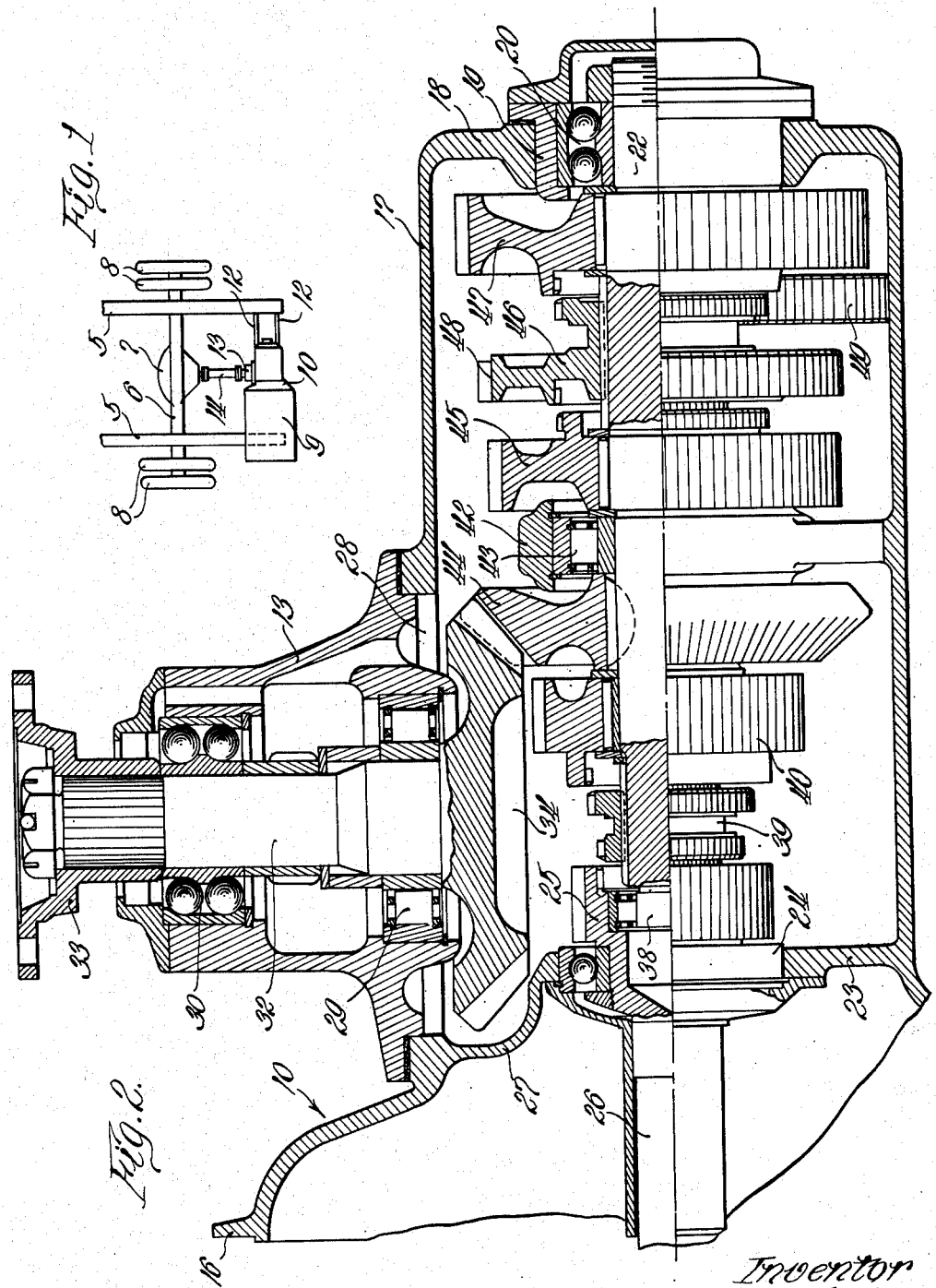

2,289,646

UNITED STATES PATENT OFFICE 2,289,646

DRIVE ASSEMBLY

Alfred E. Grater, Niles, Mich., assignor to Clark Equipment Company, Buchanan, Mich., a corporation of Michigan Application November 20, 1940, Serial No. 366,398

2 Claims. (Cl. 74—326)

This invention relates to drive assemblies for motor vehicles, especially busses, trucks and the like in which the power unit is mounted at the rear end of the chassis of the vehicle.

In such types of vehicles, the power unit is preferably mounted transversely of the vehicle with the engine being supported on one side rail with the transmission extending toward the other side rail. In such a construction it is desirable that the power output shaft of the transmission be arranged at right angles to the axis of the power unit and be positioned as closely as possible to the longitudinal center line of the vehicle in order to accommodate a standard rear axle construction in which the differential case is carried at the center of the axle housing.

The present invention is a continuation in part and an improvement of the structure shown in the copending application of myself and Walter E. Schirmer, Serial No. 342,462, filed June 26, 1940, and has for its object the provision of a construction similar to that disclosed in the aforesaid pending application but which has been revised and rearranged to move the center line of the drive output shaft closer to the flywheel housing of the engine. This provides a construction in which the output shaft lies substantially in the longitudinal center line of the vehicle, and consequently a conventional rear axle may be employed.

Another object of the present invention is the provision of a construction in which the major portions thereof are made up of standard parts and standard gears, thereby materially reducing the cost of the drive assembly and at the same time assisting greatly in servicing of the same and allowing the use of a standard rear axle housing.

In the present construction I preferably form the bell housing and transmission housing as a single unitary case, and provide in the output side of this housing a construction whereby a relatively large diameter gear of the bevel drive type can be accommodated in such position that a portion thereof overlies the main bearing of the main drive gear of the transmission. This allows the center line of the output shaft to be moved forwardly into a position where it substantially is in alinement with the sliding clutch between the direct speed and third speed gears of the transmission. The drive is provided by utilizing a transmission main shaft having a bearing intermediate its ends between the second and third speed gears. This bearing is adapted to provide adequate support for a bevel gear arrangement on the forward side thereof, and keyed to the main drive shaft. This bevel gear in turn drives the corresponding output gear which overlies the main drive gear, the shifting clutch and the third speed gear, and has a portion thereof extending into a recessed part of the bell housing in such manner that it overlies the main bearing of the main drive gear. This facilitates very much the moving of the output shaft toward the engine block to an extent such as to readily accommodate the structure to a standard rear axle housing.

Other objects and advantages of the present invention will be more apparent from the following detailed description which, taken in conjunction with the accompanying drawing, will disclose to those skilled in the art the particular construction and mode of operation of the present invention.

In the drawing:

Figure 1 is a diagrammatic plan view of the rear end of a vehicle chassis embodying the present invention; and Figure 2 is a sectional view through a transmission disclosing the particular construction embodied in the present invention.

Referring now in detail to Figure 1, I have shown the rear end of a vehicle chassis including the side rails 5 which overhang the conventional rear axle housing 6. The housing 6 is provided with the differential case 7, and at its ends is provided with the driving wheels 8. Supported on the side rails 5 rearwardly of the axle 6 is the power plant 9 of the vehicle which has bolted to the flywheel housing thereof the bell housing and transmission case 10 suitably supported on transverse cross members 12. A suitable bearing cap 13 supports the angularly directed drive shaft which, through the propeller shaft 14 and suitable universal joints, is connected to the differential 7 of the rear axle 6.

Considering now in detail the transmission as shown in Figure 2, the combined bell housing and transmission case is indicated generally at 10, and comprises a flange portion 16 which is bolted to the flywheel housing at the rear of the engine 9, and is also formed to provide the transmission housing 17 which terminates at its rear end in a suitable transverse wall 18 carrying the bearing cap 19 in which the ball bearings 20 are disposed for supporting the transmission main shaft 22.

Between the bell housing portion and the transmission housing portion of the unitary case 10 there is provided a partition 23 which supports the bearing assembly 24 for the main drive gear 25 which has the reduced shaft portion 26 connected to the driven portion of the clutch (not shown) disposed within the bell housing. The partition 23 is provided with the reentrant portion 27 on one side of the bearing 24, and the lateral face of the transmission is provided with the opening 28 to which the bearing cap 13 is adapted to be bolted.

The cap 13 is adapted to support the roller bearing assembly 29 and the ball bearing assembly 30 which journal the output shaft 32 therein, this output shaft being connected at its rear end through the universal joint flange 33 to the propeller shaft 14.

At its opposite end the output shaft 32 is provided with the bevel gear 34 which, as will be noted, extends into the recess provided by the reentrant portion 27 of the partition 23, whereby it may be moved laterally into a position such that it lies on the longitudinal center line of the vehicle.

Journalled in the recessed end of the drive gear 25 is the stub end 38 of the main shaft 22. A suitable sliding clutch 39 is adapted to be shifted in one direction for directly coupling the drive gear 25 to the shaft 22, or shifted in the opposite direction to couple the rotatably mounted third speed gear 40 to the drive shaft 22.

Intermediate the ends of the drive shaft the housing 10 is provided with a web portion 42 providing a bearing journal 43 for the main drive shaft. Adjacent this journal the shaft is provided with a bevel gear 44 which is keyed or otherwise splined thereto, and which has driving engagement with the output shaft gear 34. It will be apparent that the gear 44 drives the gear 34 whenever the shaft 22 is rotated. Mounted rearwardly of the bearing support 43 is the second speed gear 45 which is rotatable relative the shaft 22, and is adapted to be clutched thereto by means of the gear clutch 46 which, when shifted to the left, clutches the gear 45 to the shaft and when shifted to the right, clutches the first speed gear 47 to the shaft. The clutch 46 is also provided with a gear portion 48 adapted to be engaged by the reverse idler 49 to effect reverse drive of the shaft 22.

It is of course understood that disposed below the transmission shaft 22 is a parallel countershaft which carries gears having meshing engagement with the gears 25, 40 and 47, whereby the various gear ratios can be provided through the transmission. Thus, the drive gear 25 drives the countershaft, and the gears on the countershaft in turn effect drive to the gears 40, 45 and 47, which may then be selectively coupled to the shaft 22 for driving the gear 44.

From the description thus far, it will be apparent that the gear 34 is so arranged as to have a diameter such that it extends from the main bearing of the drive gear over the drive gear, selecting clutch and third speed gear into meshing engagement with the output gear 44 on the main transmission shaft 22. Thus it takes up no longitudinal space within the housing 17 that is not being utilized for the conventional parts of the transmission, and by forming the reentrant portion 27 in the housing 10, the gear 34 may be of sufficient size to provide the desired ratio and capacity, and yet not require lengthening of the transmission or of the bell housing.

As a result, a very compact and simplified arrangement is provided which greatly reduces the cost of the construction and achieves the desired result of moving the center line of the output gear substantially in the longitudinal center plate of the vehicle.

I am aware that various changes may be made in certain details of the present construction, and I therefore do not intend to be limited except as defined by the scope and spirit of the oppended claims.

I claim:

1. A transmission comprising a housing, a main shaft journalled at one end in one end of said housing, a clutch shaft extending into the opposite end of said housing and piloting the opposite end of said main shaft therein, a bearing in said opposite end of said housing for said clutch shaft, change speed gearing on said main shaft, a beveled output gear on said main shaft intermediate the ends of said housing, an output shaft extending normal to said main shaft through the side of said housing having a bevel gear within said housing driven from said main shaft bevel gear and lying entirely on the clutch bearing side of said main shaft beveled gear, said output shaft gear being of a diameter such that it overlies said clutch shaft bearing and that portion of the change speed gearing between said bearing and said first bevel gear, and means in said opposite end of said housing for accommodating that portion of said output shaft gear which overlies said bearing.

2. A transmission comprising a bell housing and a transmission housing separated by a transverse bearing retaining wall, a bearing therein, a clutch shaft journalled in said bearing and having a drive gear portion in the transmission housing, a main shaft in said transmission housing having one end journalled in said drive gear portion and having a second bearing intermediate its ends, a beveled gear keyed on said main shaft within said housing between said bearings, and an output shaft extending out of one side of said transmission housing and having a bevel gear of a diameter greater than the space between said bearings and driven by said beveled gear, said wall having a portion instruck into said bell housing to accommodate the periphery of said bevel gear which overlies the clutch shaft bearing.

ALFRED E. GRATER.